United States Patent [19]

Buchman

[11] Patent Number: 5,525,030

[45] Date of Patent: Jun. 11, 1996

[54] STACKING DEVICES

[75] Inventor: James E. Buchman, Hortonville, Wis.

[73] Assignee: Reynolds Consumer Products Inc., Appleton, Wis.

[21] Appl. No.: 522,655

[22] Filed: Sep. 1, 1995

[51] Int. Cl.[6] .................... B65G 57/02; B65G 19/18
[52] U.S. Cl. .................. 414/789.5; 108/52.1; 108/901; 206/596; 414/786
[58] Field of Search .................... 108/52.1, 55.1, 108/901; 414/786, 792.7, 789.5; 206/386, 596, 598

[56] References Cited

U.S. PATENT DOCUMENTS

| 1,849,659 | 3/1932 | Burks . | |
| 2,928,200 | 3/1960 | Shiels . | |
| 3,524,415 | 8/1970 | Heiman | 108/901 X |
| 3,563,184 | 2/1971 | Angelbeck, Jr. | 108/51 |
| 3,565,017 | 2/1971 | Jensen | 108/53 |
| 3,636,888 | 1/1972 | Angelbeck, Jr. | 108/51 |
| 3,642,165 | 2/1972 | von der Osten | 220/23.83 |
| 3,691,965 | 9/1972 | Cloyd | 108/901 X |
| 4,183,491 | 1/1980 | Sanders et al. | 108/901 X |
| 4,516,677 | 5/1985 | Rowland et al. | 206/394 |
| 4,688,684 | 8/1987 | Young et al. | 211/77 |
| 4,869,456 | 9/1989 | Jacobs | 108/901 X |
| 4,930,632 | 6/1990 | Eckert et al. | 108/901 X |
| 4,981,224 | 1/1991 | Ruching | 211/126 |
| 5,139,208 | 8/1992 | Schooley | 242/85.1 |
| 5,375,537 | 12/1994 | Gillispie et al. | 108/901 X |

FOREIGN PATENT DOCUMENTS

94/10051  5/1994  WIPO .................. 108/52.1

Primary Examiner—Karen B. Merritt
Assistant Examiner—Janice L. Krizek
Attorney, Agent, or Firm—Alan T. McDonald

[57] ABSTRACT

A stacking device comprises a base having a top and bottom side, a flange around the periphery of the base, and rib structure attached to the top side of the base and the flange. The uppermost edge of the flange resides above the top edge of the rib structure. The lowermost edge of the flange is positioned below the bottom side of the base. The stacking device is situated between two vertically adjacent gaylords.

17 Claims, 5 Drawing Sheets

5,525,030

STACKING DEVICES

FIELD OF THE INVENTION

The present invention generally relates to stacking devices and, more particularly, to an inexpensive stacking device for placement between vertically adjacent gaylords to allow numerous gaylords to be stacked on top of one another.

BACKGROUND OF THE INVENTION

Numerous products are packaged, stored, and transported in large cardboard boxes known in the art as gaylords. For example, gaylords are used to carry small pellets or granules of plastic which are ultimately processed into a final plastic product. Gaylords measure roughly four feet in width, length, and height although variations exist depending on the product contained within them.

Gaylords have finite service lives depending on their construction and the products which they enclose. Once the contents are emptied, the gaylord is reused to hold additional product or even scrap material. Utilization of cardboard is important since it is inexpensive and can be easily recycled after the service life has been reached.

The side walls of gaylords are constructed of multiple cardboard layers to enhance the strength of the gaylord. Many times the gaylords have no integral bottom. In those cases, lower portions of the side walls are turned inwardly into the box and a cardboard bottom is placed between the sides resting on the inwardly-turned lower portions. Because the products contained within a gaylord typically weigh between 800 and 1000 pounds, gaylords are frequently placed on pallets for easy transportation and storage.

Gaylords often do not have integral tops. A piece of cardboard is placed across the upper portions of the side walls and bent over the side walls so as to restrict the movement of the cardboard top. Generally, this piece of cardboard is nonstructural and merely serves as a cover for the gaylord. Thus, the contents of the gaylord are completely enclosed.

As with any other package, gaylords must be vertically stacked to provide for efficient storage of the enclosed product. However, stacking gaylords on top of one another is problematic. Because cardboard is not a rigid material, the sides of the gaylord can be damaged when subjected to typical stresses associated with handling and transportation. A side may be bent or even punctured such that its height is not the same as the remaining three sides. If a gaylord is stacked upon another gaylord having a damaged side, then the top gaylord tends to lean in the direction of the damaged side. The majority of the weight of the top gaylord now rests upon the damaged side of the lower gaylord due to the leaning. The more weight applied to the damaged side, the more damaged it becomes and the more slanted the stack becomes. Thus, stacking three or more gaylords usually amplifies the problem.

Another problem with stacking gaylords is due to the difference in sizes which may be found in a typical warehouse or industrial facility. Due to the dissimilarity, the gaylords cannot be stacked upon each other. And even if two gaylords are the same size, the sides of each gaylord must be precisely aligned to prevent the uppermost gaylord from falling from the stack. If a nonstructural top is used, it is incapable of supporting the weight of the vertically stacked gaylord and transferring the force associated with the weight to the sidewalls. And if a more robust top is used, it is still difficult to hold weight on a large flat sheet of cardboard without distorting it.

If the gaylord is exposed to a liquid, or even high humidity, the rigidness of the cardboard decreases. Many times a liquid is contained within the products packed in the gaylord. Thus, it is advantageous to capture any liquid from a source within, or even externally above, a gaylord to ensure the liquid is not released onto the gaylords stacked below the source. Additionally, capturing a solid product which is leaking from the gaylord, such as small pellets or granules of plastic, is also beneficial.

Although standard wooden pallets may be utilized to stack some products, wooden pallets are not desirable for stacking gaylords. If a wooden pallet is placed between two gaylords, the grooves between adjacent pieces of wood attached to the main wooden frame can catch a top edge of a side of the gaylord. Additionally, standard wooden pallets do not have the ability to capture a product leaking from the package. Furthermore, wooden pallets are expensive.

A need therefore exists for an inexpensive stacking device which overcomes the aforementioned shortcomings associated with stacking gaylords while capturing any product which may leak from the gaylord.

SUMMARY OF THE INVENTION

In one particular embodiment, the present invention provides a stacking device for placement between two vertically adjacent gaylords. Each stacking device has a base and a flange positioned along at least a portion of the periphery of the base. The flange has a specified height and is attached to the base at an intermediate position along the height. Rib structure is attached to the top side of the base and extends upwardly to a top edge. The rib structure is also connected to the flange which is adjacent to it thereby providing substantial rigidity throughout the entire stacking device.

When positioned between two vertically adjacent gaylords, the lowermost edge of the flange rests below the top surface of the lower gaylord while the uppermost edge of the flange is disposed above the lower surface of the top gaylord. The gaylord rests on the top edge of the rib structure which inhibits movement of the gaylord. The rib structure defines cavities which are open in the upward direction to capture any product which may leak from the top gaylord.

In another embodiment, the stacking device contains channels for receiving the fingers of a forklift. The top gaylord in a stack can be easily removed from the stack after insertion of the fingers of the forklift into the channels.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which.

Figure 1:
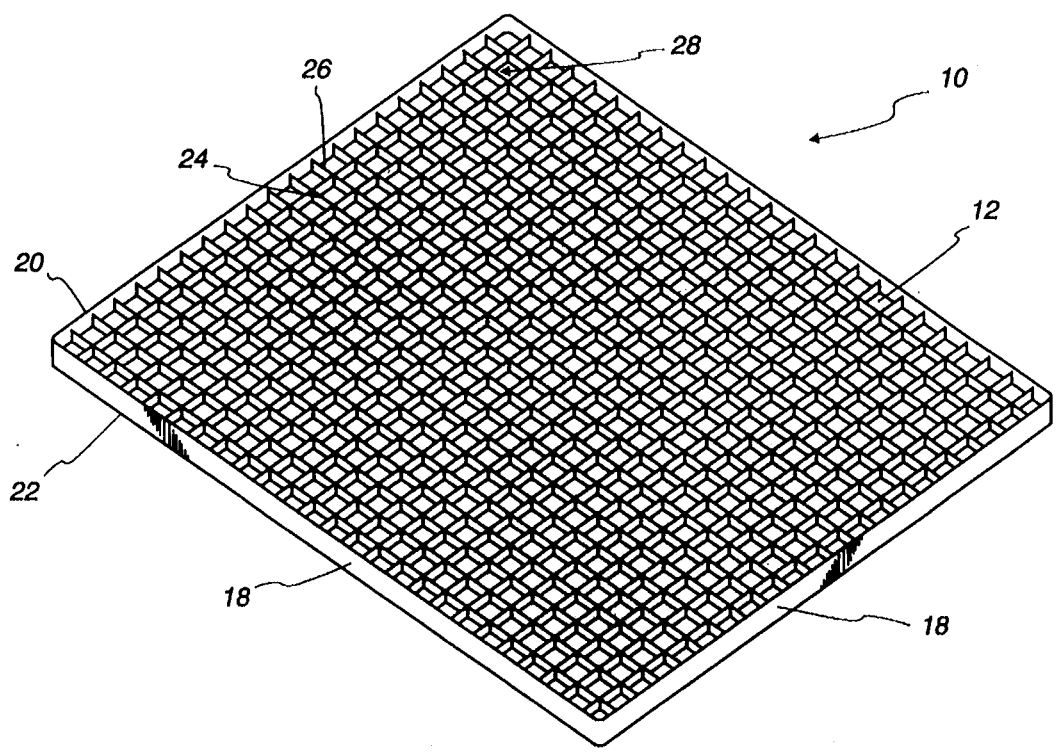
FIG. 1 is an isometric view of a stacking device.
Figure 2:
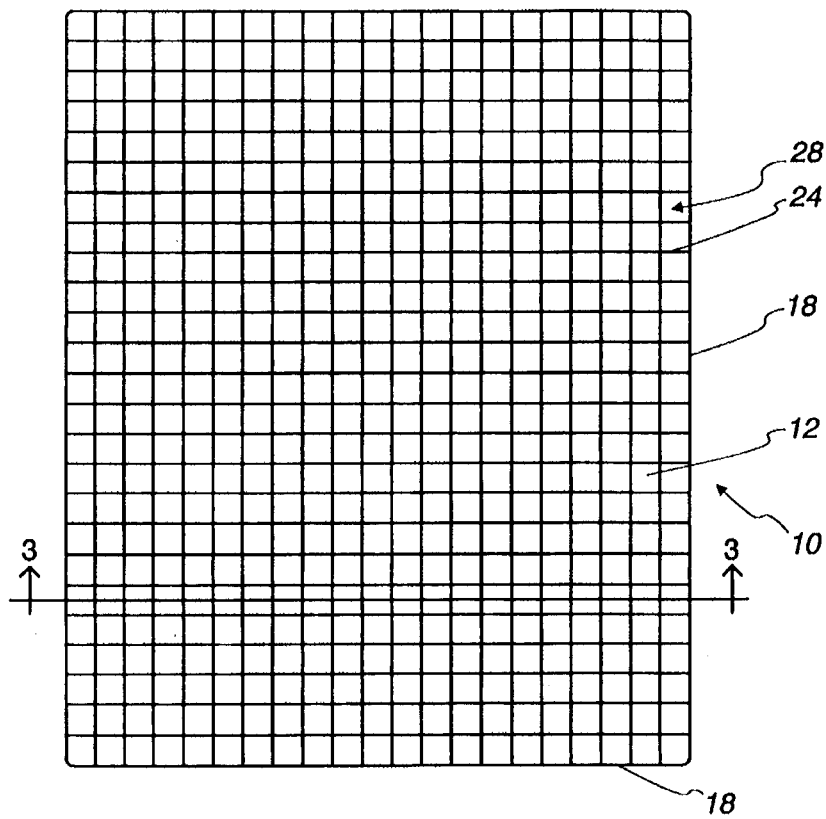
FIG. 2 is a top plan view of the stacking device.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Figure 3:
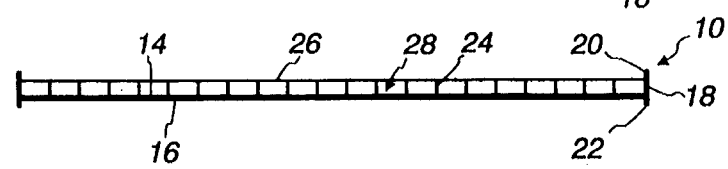
FIG. 3 is a sectional view taken along line 3—3 of FIG. 2.
Figure 4:
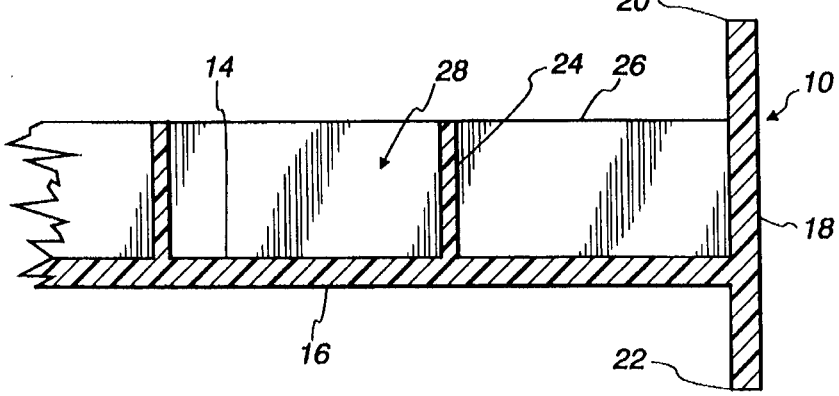
FIG. 4 is an expanded view of a portion of the sectional view of FIG. 3.

Turning now to the drawings, FIGS. 1–4 illustrate a stacking device 10 in an isometric view, a top plan view, a sectional view, and an expanded sectional view, respectively. The stacking device 10 has a rectangular base 12 with an upper side 14 (FIGS. 3 and 4 only) and a lower side 16 (FIGS. 3 and 4 only). Connected to the base 12 around its periphery is a flange 18 which has an uppermost edge 20 and a lowermost edge 22.

Within the volume defined by the base 12 and the flange 18, lies a plurality of rib structure 24. The rib structure 24 is attached to the base 12 at its upper surface 14 and also to the inward sides of the flange 18. The rib structure 24 has a predetermined height which terminates at a top edge 26. The uppermost edge 20 of the flange 18 sits above the top edge 26 of the rib structure 24. As shown, the rib structure 24 and flange 18 form a rectangular matrix structure along the upper surface 14 of the base 12.

To receive and capture a product which may be leaking from a gaylord, a plurality of cavities 28 exists on the base 12. Each cavity 28 is defined by four sides which are portions of the rib structure 24 and a bottom which is a portion of the upper surface 14 of the base 12. An opening facing upwardly exists on each cavity 28.

The stacking device 10 in the configuration illustrated by FIGS. 1–4 is very rigid. The rib structure 24 helps to resist any torsional stresses which would otherwise result in the deformation of the base 12. Additionally, the rib structure 24 is capable of supporting a substantial axial load placed upon its top edge 26.

A gaylord is a large cardboard container having a volume generally between 60 and 130 cubic feet that is used to enclose various products. Often, those products are raw materials. For example, in the plastics industry, gaylords are used to hold small pellets or granules of plastic prior to processing them into the end product. Gaylords generally are not equipped with a structurally sound cover, and many times, have no cover at all. When the pellets or granules of a gaylord are unloaded into a hopper for the start of the initial process, the gaylord is then refilled with additional pellets and stored until the time at which those pellets are needed. As with any packaging, the ability to efficiently store the gaylords is critical. Consequently, gaylords are usually stacked on top of each other. However, the easily-damaged cardboard construction and the lack of a structural cover make stacking a difficult task.

Figure 5:
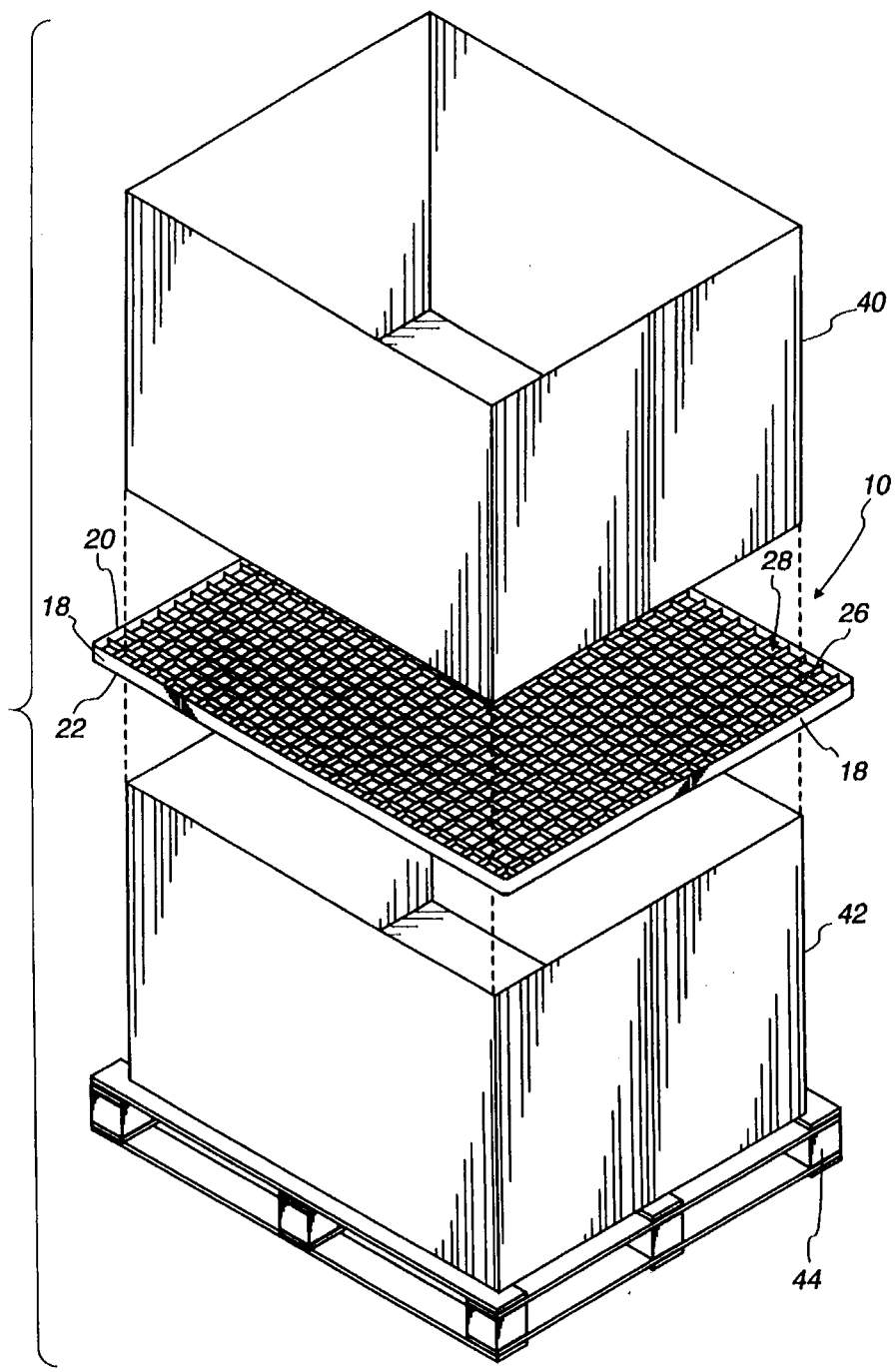
FIG. 5 is an exploded isometric view of gaylords being stacked with the stacking device.
Figure 6:
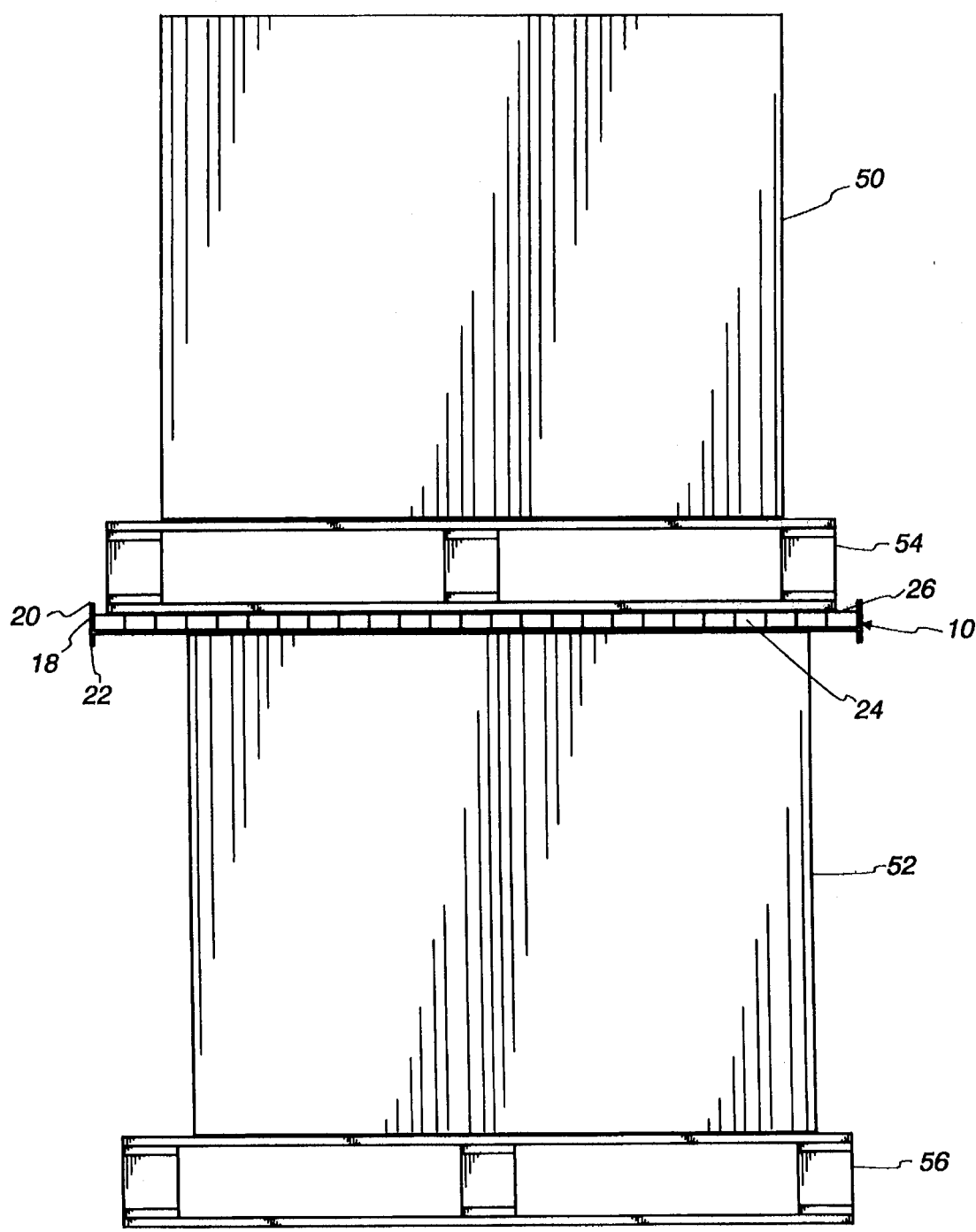
FIG. 6 is a sectional view of gaylords on pallets being stacked with the stacking device.

The stacking device 10 is a simplistic apparatus which provides for an easy method in which gaylords can be stacked as can be seen in FIGS. 5 and 6. In FIG. 5, an upper gaylord 40 is disposed above the stacking device 10 while a lower gaylord 42 is disposed below the stacking device 10. In this illustration, lower gaylord 42 is shown resting on a pallet 44. The lower side 16 of the base 12 (not shown) engages the lower gaylord 42 at the top edge of the sides. The top edge 26 of the rib structure 24 engages the lower surface of the upper gaylord 40. The flange 18 captures each of the gaylords 40, 42 since the uppermost edge 20 of the flange 18 is positioned above the lower surface of the upper gaylord 40, while the lowermost edge 22 of the flange 18 is disposed below the upper edge of the sides of the lower gaylord 42. To conserve on the amount of material used in each stacking device 10, the flange 18 does not have to extend completely around the periphery as it is shown in FIG. 5. As long as a portion of the flange 18 is present to keep the gaylords 40, 42 from shifting, the primary purpose of the flange 18 is accomplished. Although FIG. 5 only shows two gaylords 40, 42, numerous gaylords can be placed on the same stack with the stacking device 10 between them.

This arrangement of the gaylords 40, 42 and the stacking device 10 in FIG. 5 is useful for many reasons. One important benefit is that stacking is accomplished very easily without the risk of tipping. Prior to stacking upper gaylord 40 on top of lower gaylord 42, the stacking device 10 is set on top of lower gaylord 42. Even if one side of lower gaylord 42 is damaged or distorted such that its top edge cannot engage the lower surface 16 of the base 12, the stacking device 10 can still be adequately supported by the remaining three sides of lower gaylord 42. If no stacking device 10 is used, this could only be accomplished if gaylords 40 and 42 are perfectly aligned which is extremely difficult. If lower gaylord 42 has multiple sides damaged to the extent that the stacking device 10 becomes tilted when it rests on the lower gaylord 42, the uppermost edge 20 of the flange 18 catches one of the sides of the lower gaylord 42 and the stacking device 10 remains stationary.

Not only does the flange 18 capture the upper gaylord 40 and keep it from sliding, but the rib structure 24 also serves to resist motion of the upper gaylord 40. Because the top edge 26 of the rib structure 24 engages the lower surface of the upper gaylord 40, the pressure exerted at the points of engagement is much higher than if two flat surfaces were in contact. Thus, the top edge 26 tends to press into the cardboard lower surface of the upper gaylord 40 under the weight of the upper gaylord 40 creating slight indentations. These slight indentations in the lower surface of the upper gaylord 40 around the top edge 26 of the rib structure 24 help resist the movement of the upper gaylord 40 relative to the stacking device 10. The profile of the rib structure 24, especially the top edge 26, is chosen to create a more pronounced indentation without damaging the upper gaylord 40. This can be accomplished by having the width of each rib element within the rib structure 24 decrease with respect to its height. Thus, the top edge 26 could be a true edge, or a thin flat surface. Also, the top edge 26 could have small cut-outs along its length so that only portions of the top edge 26 contact the gaylord thereby increasing the contact pressure along those contacting portions of the top edge 26.

When stacking device 10 is used, there is no longer a need to provide the gaylords 40 and 42 with a cover. The stacking device 10 rests on the top edge of the sides of the lower gaylord 42 with the base 12 of the stacking device acting as the cover. This is cost effective since the cardboard covers which had previously been used had a very limited service life in comparison with the stacking device 10.

The plurality of cavities 28 produced by the rib structure 24 also serve to accumulate any product which may be leaking from upper gaylord 40. For example, if upper gaylord 40 had an open seam or a puncture in its side or bottom, then a small product, such as plastic pellets or granules, could leak from the upper gaylord 40. Because, the cavities 28 open upwardly and the bottom surface of the upper gaylord 40 lies above the base 12 of the stacking device 10, the expelled product merely fills the volume of the cavities 28. This reduces the accumulation of foreign objects on the floor of the warehouse or factory which increases safety. Additionally, an operator can return any product captured within the cavities 28 to the gaylord. And, based on the amount of product in the cavities 28, the operator can make a decision as to whether the gaylord should be reused, or collapsed and recycled. Prior to the use of these stacking devices 10, if product was found on the floor, an operator would have trouble discerning which gaylord in the stack or stacks was leaking.

Although gaylords are not suited for storing liquids since they are cardboard, they often contain products which have vessels containing liquid. If the vessel of the product containing the liquid fails, then the stacking device 10 situated below that product gathers the fluid in its plurality of cavities 28. Although the gaylord housing the leaking vessel may be permanently damaged due to the liquid absorbed by the cardboard, the gaylords stationed below the leaking vessel will be spared from damage.

FIG. 6 illustrates a cross-sectional view of an arrangement similar to that of FIG. 5. However, FIG. 6 illustrates the arrangement of an upper gaylord 50 and a lower gaylord 52 with multiple pallets 54 and 56 included. Instead of the lower surface of upper gaylord 50 engaging the top edge 26 of the rib structure 24, the pallet 54 serves as an intermediary between the stacking device 10 and the upper gaylord 50. Just as the stacking device 10 of FIG. 5 held upper gaylord 40 steady, the stacking device 10 of FIG. 6 holds the pallet 54 and upper gaylord 50 in position. This is beneficial in that a forklift could be easily used to hoist upper gaylord 50 and its associated pallet 54 from the stack. Although FIG. 6 only shows two sets of gaylords and pallets, numerous gaylords and their associated pallets could be placed on the same stack.

Figure 7:
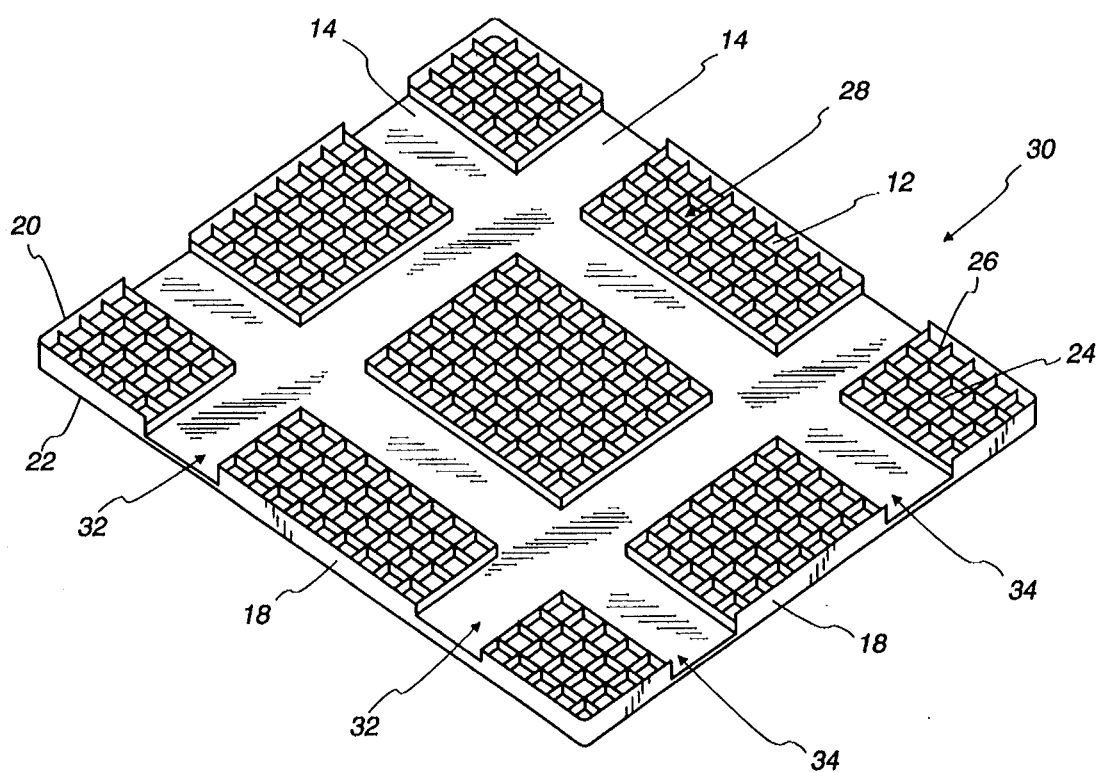
FIG. 7 is an isometric view of a stacking device with four channels for receiving the fingers of a forklift.

FIG. 7 shows an alternative embodiment of a stacking device 30 which is useful if the gaylords are to be hoisted and transported via a forklift. The stacking device 30 has the same features as the stacking device 10 of FIGS. 1-6 and, therefore, there is no deviation in the reference numerals associated with the base 12 and its subparts, the flange 18 and its subparts, the rib structure 24 and its subparts, and the plurality of cavities 28. However, the stacking device 30 of FIG. 7 now has a first pair of channels 32 and a second pair of channels 34 in which no rib structure 24 is present. Additionally, a portion of the flange 18 is removed to provide a complete passage across the entire base 12. Thus, the upper surface 14 of the base 12 is now exposed along these pairs of channels 32 and 34. This facilitates the insertion of two fingers on a standard forklift from all four sides of the stacking device 30 while a gaylord is in contact with the top edge 26 of the rib structure 24. After insertion, the gaylord can be hoisted and transported to its next destination. Alternatively, only one pair of channels could be placed across the stacking device 30, which would only allow a forklift to approach from two sides of the stacking device 30.

The stacking device 10 is preferably made of polymers so as to be cost-effective. For example, polyethylene or polystyrene are two of numerous polymeric alternatives which are inexpensive and provide good strength. Also, a reinforced polymer can be used if significant strength is required. The stacking device 10 may easily be made from metal as well.

The polymeric stacking device 10 may be manufactured by numerous methods depending on which type of plastic is chosen. For example, the stacking device 10 may be manufactured by thermoforming, injection molding, or compression molding. The result is that a strong, yet inexpensive stacking device can be produced.

Because most gaylords have a length and width between three feet and five feet, the base 12 of the stacking device 10 must have a similar area. Thus, the width and length of the base 12 of the stacking device 10 is generally in the range of 36 inches to 60 inches. However, some industries may use larger or smaller gaylords and the dimensions of the stacking device 10 would then be tailored accordingly. The base 12 generally has a thickness ranging from about 0.10 inch to about 0.40 inch depending on the material used and the surface area of the base 12.

To allow for the stacking procedure, the height of the flange 18 ranges from about 1.5 inches to about 5.00 inches overall. The flange 18 is connected to the base 12 at an intermediate position along the height. Thus, the uppermost edge 20 of the flange 18 extends in the range from about 0.50 inch to about 2.0 inches above the top edge 26 of the rib structure 24. Similarly, the lowermost edge 22 of the flange 18 extends in the range from about 0.50 inch to about 2.0 inches below the bottom side 16 of the base 12.

The amount of rib structure 24 depends on the rigidity needed in the overall stacking device 12. The size of the cavities 28 are dictated by the rib structure 24. Generally these cavities 28 have a width and length ranging from approximately 1.0 inch to approximately 3.0 inches.

While the present invention has been described with reference to one or more particular embodiments, those skilled in the art will recognize that many changes may be made thereto without departing from the spirit and scope of the present invention.

For example, the rib structure 24 could have a different configuration resulting in cavities 28 with a different shape. Likewise, the shape of the stacking device 10 does not have to be rectangular as shown in the figures. Also, the dimensions of the stacking device 10 could be modified.

Each of these embodiments and obvious variations thereof is contemplated as falling within the spirit and scope of the invention, which is set forth in the following claims.

What is claimed is:

1. A stacking device for gaylords, comprising:

a base having a top surface, a bottom surface, and a periphery;

a flange positioned along at least a portion of said periphery and substantially perpendicular to said base, said flange surrounding said base and having a specified height and being attached to said base at an intermediate position along said height thereby creating an uppermost edge and a lowermost edge of said flange; and a rib structure attached to said top surface of said base and extending upwardly to a top surface, a portion of said rib structure being adjacent and attached to said flange, said rib structure defining a plurality of cavities, wherein said lowermost edge of said flange extends below said bottom surface of said base and surrounds an upper surface of a first of said gaylords upon which said base rests and wherein said uppermost edge of said flange extends above said top surface of said rib structure and surrounds a lower edge of a second of said gaylords resting upon said top surface of said rib structure.

2. The stacking device of claim 1, wherein each of said plurality of cavities is substantially rectangular.

3. The stacking device of claim 2, wherein each of said plurality of cavities has a width and length, said width and said length ranging from approximately 1.0 inch to approximately 3.0 inches.

4. The stacking device of claim 1, wherein said stacking device is made of a polymeric material.

5. The stacking device of claim 4, wherein said polymeric material is selected from the group consisting of polyethylene, polystyrene, and reinforced polymers.

6. The stacking device of claim 1, wherein said base has a thickness ranging from about 0.10 inch to about 0.40 inch.

7. The stacking device of claim 1, wherein said height of said flange ranges from about 1.5 inches to about 5.00 inches.

8. The stacking device of claim 1, wherein said base has a width and a length, said width and said length ranging from about 36 inches to about 60 inches.

9. The stacking device of claim 1, wherein said uppermost edge of said flange extends in the range of from about 0.50 inch to about 2.0 inches above said top surface of said rib structure.

10. The stacking device of claim 1, wherein said lowermost edge of said flange extends in the range of about 0.50 inch to about 2.0 inches below said bottom surface of said base.

11. The stacking device of claim 1, wherein said top surface of said rib structure has a configuration for creating an indentation on a surface of said second of said gaylords.

12. The stacking device of claim 1, wherein said rib structure and said top surface of said base define first and second channels for receiving two fingers from a forklift, said flange having a first set of openings where said first and second channels intersect said periphery of said base.

13. The stacking device of claim 12, wherein said rib structure and said top surface of said base define third and forth channels for receiving two fingers from a forklift, said third and fourth channels being substantially perpendicular to said first and second channels, said flange having a second set of openings where said third and fourth channels intersect said periphery of said base.

14. A method of storing a first and second gaylord comprising the steps of:

providing a stacking device having a base, a flange and a rib structure, said base having top and bottom surfaces and a periphery, said flange surrounding said periphery and being substantially perpendicular to said base, said flange having a height and being attached to said base at an intermediate position along said height thereby creating an uppermost edge and a lowermost edge, said rib structure being attached to said top surface of said base and extending upwardly to a top surface, a portion of said rib structure being adjacent and attached to said flange;

placing said stacking device on top of said first gaylord, said bottom surface of said base contacting an upper surface of said first gaylord, said lowermost edge of said flange being below and surrounding said upper surface of said first gaylord;

hoisting said second gaylord; and positioning said second gaylord on top of said stacking device, a lower surface of said second gaylord contacting said top surface of said rib structure, said uppermost edge of said flange being above and surrounding said lower surface of said second gaylord.

15. The method of claim 14, wherein said second gaylord is disposed on a top surface of a pallet having top and bottom surfaces and said step of hoisting said second gaylord is accomplished by lifting said pallet on which said second gaylord is disposed, and said step of positioning said second gaylord is accomplished by positioning said pallet onto said stacking device while said second gaylord is disposed on said pallet, said uppermost edge of said flange being above and surrounding said bottom surface of said pallet.

16. The method of claim 14, wherein said rib structure and said top surface of said base define first and second channels for receiving two fingers from a forklift, said flange having openings where said first and second channels intersect said periphery of said base, and said step of hoisting is accomplished by use of said forklift and said step of positioning includes the step of aligning said two fingers of said forklift over said first and second channels.

17. The method of claim 14 wherein said rib structure defines a plurality of cavities and said lower surface of said second gaylord engages said top surface of said rib structure such that said cavities are open to said lower surface of said second gaylord to thereby capture an expelled product from said second gaylord.

* * * * *